United States Patent
Gedik et al.

(10) Patent No.: US 7,299,126 B2
(45) Date of Patent: Nov. 20, 2007

(54) SYSTEM AND METHOD FOR EVALUATING MOVING QUERIES OVER MOVING OBJECTS

(75) Inventors: Bugra Gedik, Atlanta, GA (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 10/700,168

(22) Filed: Nov. 3, 2003

(65) Prior Publication Data

US 2005/0096841 A1 May 5, 2005

(51) Int. Cl.
*G01C 21/00* (2006.01)
(52) U.S. Cl. .................. 701/207; 701/213; 707/1; 707/3; 342/357.06
(58) Field of Classification Search .......... 700/28, 700/56; 717/107; 701/1, 207, 213; 707/1, 707/3; 342/357.06; 455/456.1, 41.2, 458, 455/141

See application file for complete search history.

(56) References Cited

U.S. PATENT DOCUMENTS

| | | | | |
|---|---|---|---|---|
| 5,572,634 | A | * | 11/1996 | Duluk, Jr. .................. 345/419 |
| 5,729,471 | A | * | 3/1998 | Jain et al. .................. 725/131 |
| 5,745,126 | A | * | 4/1998 | Jain et al. .................. 382/154 |
| 5,850,352 | A | * | 12/1998 | Moezzi et al. ............. 345/419 |
| 5,915,251 | A | * | 6/1999 | Burrows et al. ........... 707/102 |
| 5,969,755 | A | * | 10/1999 | Courtney .................... 348/143 |
| 6,054,991 | A | * | 4/2000 | Crane et al. ............... 345/420 |

(Continued)

FOREIGN PATENT DOCUMENTS

CN 1603749 A * 4/2005

(Continued)

OTHER PUBLICATIONS

B. Gedik et al., Processing moving queries over moving objects using motion-adaptive indexes, Knowledge and Data Engineering, IEEE Transactions on, vol. 18, Issue 5, May 2006 pp. 651-668, Digital Object Identifier 10.1109/TKDE.2006.81.*

(Continued)

*Primary Examiner*—Cuong Nguyen
(74) *Attorney, Agent, or Firm*—George A Willinghan, III; August Law Group, LLC (57) ABSTRACT

The present invention is directed to a system and a method for evaluating a plurality of moving queries over moving objects. The method, which can be embodied in a computer readable medium containing computer readable code, constructs motion-adaptive bounding boxes around the objects and queries and indexes the objects and queries based upon the bounding boxes. Predictive query results are used to optimize the evaluation of the moving queries. The bounding boxes vary in size and shape depending on the speed and motion direction of the objects and queries. The system of the present invention includes the moving objects and queries, each having an associated motion-adaptive bounding box. The system also provides for a monitoring system capable of monitoring the location and motion of the moving objects and moving queries and of evaluating the moving queries. The monitoring system includes a motion-adaptive query index and a motion-adaptive object index.

13 Claims, 8 Drawing Sheets

U.S. PATENT DOCUMENTS

| | | | | |
|---|---|---|---|---|
| 6,058,397 | A * | 5/2000 | Barrus et al. | 707/104.1 |
| 6,185,314 | B1 * | 2/2001 | Crabtree et al. | 382/103 |
| 6,236,736 | B1 * | 5/2001 | Crabtree et al. | 382/103 |
| 6,263,088 | B1 * | 7/2001 | Crabtree et al. | 382/103 |
| 6,289,334 | B1 * | 9/2001 | Reiner et al. | 707/3 |
| 6,295,367 | B1 * | 9/2001 | Crabtree et al. | 382/103 |
| 6,424,370 | B1 * | 7/2002 | Courtney | 348/143 |
| 6,711,563 | B1 * | 3/2004 | Koskas | 707/3 |
| 6,742,037 | B1 * | 5/2004 | Hall et al. | 709/228 |
| 6,791,549 | B2 * | 9/2004 | Hubrecht et al. | 345/473 |
| 6,801,850 | B1 * | 10/2004 | Wolfson | 701/209 |
| 6,809,738 | B2 * | 10/2004 | Hubrecht et al. | 345/543 |
| 6,895,329 | B1 * | 5/2005 | Wolfson | 701/209 |
| 6,925,473 | B2 * | 8/2005 | Thompson et al. | 707/104.1 |
| 6,941,543 | B1 * | 9/2005 | Brown et al. | 717/107 |
| 6,954,764 | B2 * | 10/2005 | Biswas et al. | 707/104.1 |
| 6,965,827 | B1 * | 11/2005 | Wolfson | 701/207 |
| 6,968,271 | B1 * | 11/2005 | Wolfson | 701/209 |
| 6,970,871 | B1 * | 11/2005 | Rayburn | 707/10 |
| 6,996,402 | B2 * | 2/2006 | Logan et al. | 455/456.1 |
| 7,010,522 | B1 * | 3/2006 | Jagadish et al. | 707/3 |
| 7,016,781 | B1 * | 3/2006 | Wolfson | 701/209 |
| 7,024,020 | B2 * | 4/2006 | Lee et al. | 382/103 |
| 7,045,787 | B1 * | 5/2006 | Verbinski et al. | 250/358.1 |
| 7,068,288 | B1 * | 6/2006 | Good et al. | 345/619 |
| 7,107,285 | B2 * | 9/2006 | von Kaenel et al. | 707/104.1 |
| 7,117,199 | B2 * | 10/2006 | Frank et al. | 707/3 |
| 2001/0032268 | A1 * | 10/2001 | Brown et al. | 709/230 |
| 2002/0032697 | A1 * | 3/2002 | French et al. | 707/500.1 |
| 2002/0057283 | A1 * | 5/2002 | Biswas et al. | 345/700 |
| 2002/0087570 | A1 * | 7/2002 | Jacquez et al. | 707/100 |
| 2002/0097893 | A1 * | 7/2002 | Lee et al. | 382/103 |
| 2003/0113009 | A1 * | 6/2003 | Mueller et al. | 382/147 |
| 2003/0122657 | A1 * | 7/2003 | Hodsdon et al. | 340/323 R |
| 2004/0117358 | A1 * | 6/2004 | von Kaenel et al. | 707/3 |
| 2004/0198398 | A1 * | 10/2004 | Amir et al. | 455/456.6 |
| 2004/0203852 | A1 * | 10/2004 | Janakiraman | 455/456.1 |
| 2005/0054290 | A1 * | 3/2005 | Logan et al. | 455/41.2 |
| 2005/0071083 | A1 * | 3/2005 | Chen et al. | 701/213 |
| 2005/0071321 | A1 * | 3/2005 | Chen et al. | 707/3 |
| 2005/0096841 | A1 * | 5/2005 | Gedik et al. | 701/207 |
| 2006/0085370 | A1 * | 4/2006 | Groat et al. | 707/1 |
| 2006/0287984 | A1 * | 12/2006 | Chen et al. | 707/3 |

FOREIGN PATENT DOCUMENTS

| | | | | |
|---|---|---|---|---|
| CN | | 1892656 A | * | 1/2007 |
| EP | | 1104151 A2 | * | 5/2001 |
| JP | | 2001216065 A | * | 8/2001 |
| KR | | 546799 B1 | * | 1/2006 |

OTHER PUBLICATIONS

B. Gedik et al., MobiEyes: A Distributed Location Monitoring Service Using Moving Location Queries, Mobile Computing, IEEE Transactions on, vol. 5, Issue 10, Oct. 2006 pp. 1384-1402, Digital Object Identifier 10.1109/TMC.2006.153.*

Haibo Hu et al., Range nearest-neighbor query, Knowledge and Data Engineering, IEEE Transactions on, vol. 18, Issue 1, Jan. 2006 pp. 78-79, Digital Object Identifier 10.1109/TKDE.2006.15.*

K. C. K. Lee et al., Tracking Nearest Surrounders in Moving Object Environments, 2006 ACS/IEEE International Conference on Pervasive Services, Jun. 26-29, 2006 pp. 3-12.*

H. M. O. Mokhtar et al., Universal trajectory queries for moving object databases, Mobile Data Management, 2004. Proceedings. 2004 IEEE International Conference on, 2004 pp. 133-144, Digital Object Identifier 10.1109/MDM.2004.1263051.*

Y. Ishikawa et al., Continual neighborhood tracking for moving objects using adaptive distances, Database Engineering and Applications Symposium, 2002. Proceedings. International, Jul. 17-19, 2002 pp. 54-63, Digital Object Identifier 10.1109/IDEAS.2002. 1029656.*

P.K. Agarwal et. al., "Indexing Moving Points", Proceedings of ACM Symposium on Principles of Database Systems, 2000.

G. Kollios et al., "On Indexing Mobile Objects", Proceedings of Symposium on Principles of Database Systems, 1999.

S. Prabhakar et al., "Query Indexing and Velocity Constrained Indexing", IEEE Transactions on Computers, 51:1124-1140 Oct. 2002.

* cited by examiner

FIG. 8

SYSTEM AND METHOD FOR EVALUATING MOVING QUERIES OVER MOVING OBJECTS

FIELD OF THE INVENTION

This invention relates to location and management of many objects. More specifically, present invention relates to the evaluation of moving continual queries over moving objects.

BACKGROUND OF THE INVENTION

Advances in mobile computing and object or position sensing technologies, for example global positioning systems (GPS), radio frequency identification (RFID), Bluetooth technologies and wireless networking technologies, have facilitated the emergence of numerous applications for the continuous location and management of moving objects. These emerging applications include, for example, environmental awareness applications, object tracking and monitoring services, inventory control systems, wireless communication systems, and computer games. These applications need to track many moving objects simultaneously, including physical objects that move in two-dimensional or three-dimensional space, for example people, cars, airplanes and cargo ships. Moving objects can also be stock prices, distributed sensor readings for environmental surveillance including temperature and pressure, and public health data such as a number of sick people and a type of illness.

In order to provide tracking capabilities, the moving objects are equipped with location-awareness or remote identification equipment and are treated as points in multi-dimensional space whose positions change with time. The locations of these points can be tracked and queried. Tracking of points in space can be accomplished by technologies available in the art such as GPS, triangulation, and RFID systems. These tracking systems are used to locate objects or points that satisfy a given set of criteria called queries. These queries over moving objects tend to be continual, i.e., repeated periodically over time. In addition, queries can be stationary or can be associated with moving objects and hence moving. Moving queries can be general range queries, for example finding all the objects currently located inside the boundaries of a range, or k-nearest neighbors (kNN) queries, for example finding the k-nearest objects that are closest to a given point.

Previous approaches, however, assumed that the queries were stationary. A continual stationary range query specifies a spatial range together with a time interval and identifies the set of objects located within the spatial range during the specified time interval. The result of the query changes as time progresses due to the moving nature of the objects that are being queried. A moving range query has a fundamental difference when compared with a stationary query. A moving range query is associated with a moving object, called the focal object of the query, and the spatial range of the query moves together with the movement of the query's focal object. With a moving query, the identification of objects that satisfy the query over a given time period becomes more complex.

Because of the continuously changing positions of moving objects, it is very time consuming to process queries over moving objects. This problem becomes even more challenging when the queries are also moving. To speed up the query processing, various approaches have been proposed to index moving objects alone (e.g., "Indexing moving objects," by P. K. Agarwal et al., Proceedings of ACM Symposium on Principles of Database Systems, 2000; "On indexing mobile objects," by G. Kollios et al., Proceedings of Symposium on Principles of Database Systems, 1999), or to index queries alone (e.g., "Query indexing and velocity constrained indexing: scalable techniques for continuous queries on moving objects," by S. Prabhakar et al., IEEE Transactions on Computers, 51:1124-1140, October 2002).

With both moving queries and moving objects, searching and maintaining the object index or the query index becomes exceedingly costly, because updates to the indexes are required once either the objects or the queries have moved. As an alternative to indexing, a brute force linear search, where each moving query is evaluated against every moving object, can be used to process moving queries over moving objects. This brute force approach, however, is not scalable to a large number of moving queries and moving objects. The need exists, therefore, for an efficient system and method for evaluating moving queries over moving objects. In addition, it is desired to provide the fastest access possible to large volumes of data and to preserve the spatial relationships among indexed objects such as nesting and neighborhood.

SUMMARY OF THE INVENTION

The present invention is directed to a system and a method for evaluating a plurality of moving queries over moving objects. The method for evaluating the moving queries involves constructing a bounding box to contain and to correspond with each one of the moving objects and moving queries. Using the corresponding bounding box, an object index is created for each one of the moving objects, and a query index is created for each one of the moving queries. The objects and queries are indexed based upon the associated bounding boxes as opposed to the location of the objects and queries themselves. The moving queries are then evaluated periodically using the query and object indexes.

The bounding boxes are motion-adaptive bounding boxes that vary in size and shape depending on the speed and direction of the moving objects and queries. Although the objects and queries move, the bounding boxes are constructed so that the objects and queries remain within a given box for a period of time so that multiple evaluations can be conducted before new bounding boxes need to be created.

The present invention also uses predictive query results in combination with the bounding boxes to identify when the motion functions associated with the objects and queries need to be updated and to narrow the number of objects to be considered in query evaluations. The objects to be considered in query evaluations are determined based upon whether or not the bounding boxes associated with the moving objects intersect the bounding boxes associated with a given query. Only moving objects having bounding boxes that intersect the bounding box of the query are considered. The necessary information about the moving objects and moving queries are contained in tables that are periodically scanned and updated. The tabulated information is used in the query evaluations. The present invention also includes a computer readable medium that contains a computer executable code that when read by a computer causes the computer to perform a method for evaluating a plurality of moving queries over a plurality of moving objects.

The present invention is also directed to a system for evaluating a plurality of moving queries over a plurality of moving objects. The system includes a plurality of moving objects and a plurality of moving queries associated with a spatial range. A plurality of motion-adaptive bounding boxes are associated with one of the moving objects or moving queries. The system also includes at least one monitoring system capable of monitoring the location and motion of the moving objects and moving queries and of evaluating the moving queries. The monitoring system includes a motion-adaptive query index and a motion-adaptive object index for use in evaluating the plurality of moving queries.

DETAILED DESCRIPTION

Figure 1:
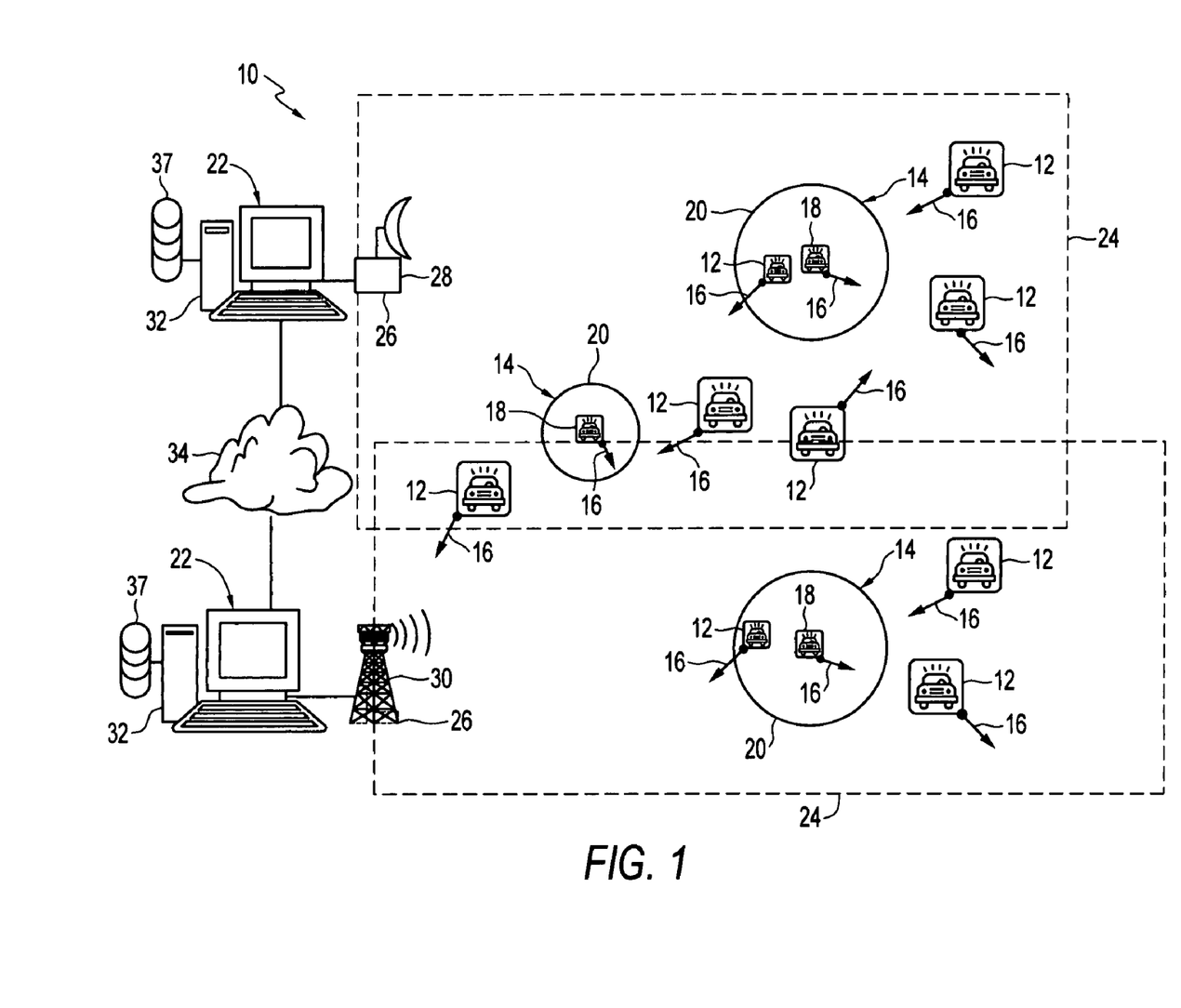
FIG. 1 is a schematic representation of an embodiment of a system for evaluating moving queries over moving objects in accordance with the present invention.

The system and method in accordance with the present invention can be applied to moving continual range queries in multidimensional space. Referring initially to FIG. 1, an embodiment of a system 10 for evaluating moving queries over moving objects in accordance with the present invention is illustrated. As shown, the system 10 includes a plurality of moving objects 12 and a plurality of moving queries 14. Each of the moving objects 12 is associated with a motion vector 16, indicating present direction and speed. The present invention can accommodate any number of moving objects 12. The moving objects 12 can represent physical objects that move in a two-dimensional or three-dimensional space, for example people, cars, airplanes, cargo ships, delivery vans, cellular phones, taxi cabs, police vehicles, fire department equipment, laptop or portable computers, packages and inventory items. Moving objects may also include things not traditionally associated with the conventional meaning of "object". For example, moving objects may also include stock prices and distributed sensor readings for environmental surveillance, such as temperature and barometric pressure.

Any suitable method of defining temporal and spatial ranges can be used to define the moving queries 14. In one embodiment, each moving query 14 is associated with at least one focal object 18 and a spatial range 20 surrounding that focal object 18. Alternatively, the moving query can be associated with a spatial range that does not have a focal object 18. For stationary queries, the focal object 18 is stationary, and for moving queries 14, the focal object 18 is in motion. The current speed and direction of each focal object 18 is indicated by the motion vector 16. Since the moving queries 14 move in association with the focal objects 18, the motion vectors 16 also indicate the moving directions of the queries 14. The focal object 18 can be located throughout the area or volume of the spatial range 20. For example, the focal object 18 can be disposed at the center of the circle for a circular spatial range 20.

Suitable spatial ranges 20 include, but are not limited to, two-dimensional shapes such as circles, ovals, triangles, rectangles and squares and three-dimensional shapes such as spheres, cylinders, cones and cubes. For example, in FIG. 1 the moving queries 14 are illustrated with circular spatial query ranges 20. In general, a moving query is an analysis or evaluation of the moving objects based upon parameters that spatially or temporally change. An example of a moving query 14 is "Locate all the moving taxicabs that at any given time are located within a square mile of a moving car." In this example, the taxicabs are the moving objects, and the spatial range of the moving query encompasses the one square mile spatial region surrounding the moving focal object, which is the moving car.

Figure 2A:
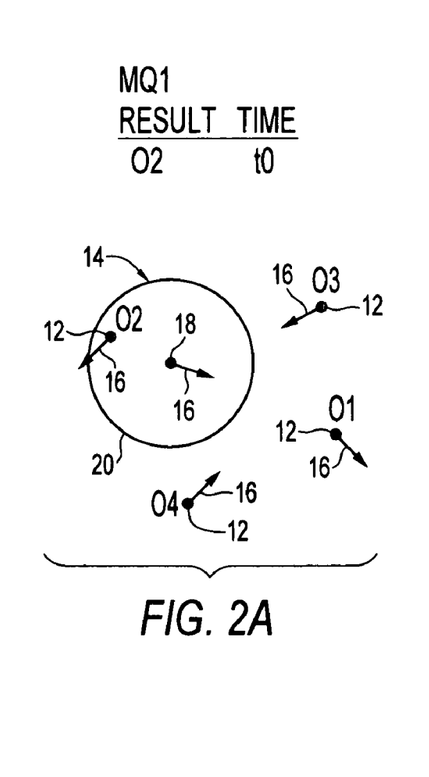
FIG. 2a is a schematic representation of a moving query at a first time.
Figure 2B:
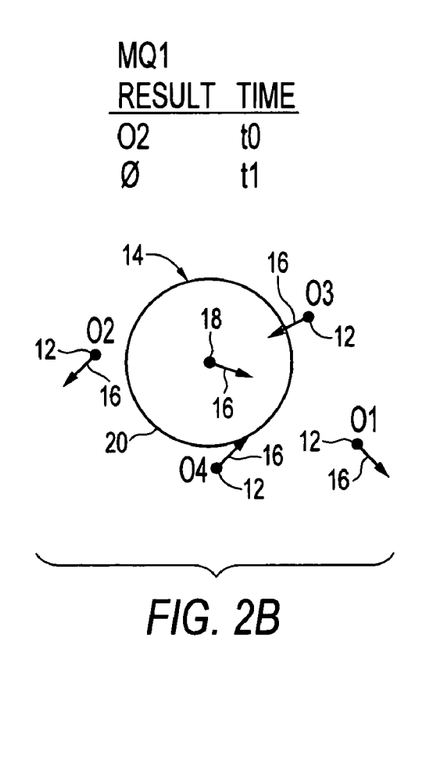
FIG. 2b is a schematic representation of the moving query at a second time.
Figure 2C:
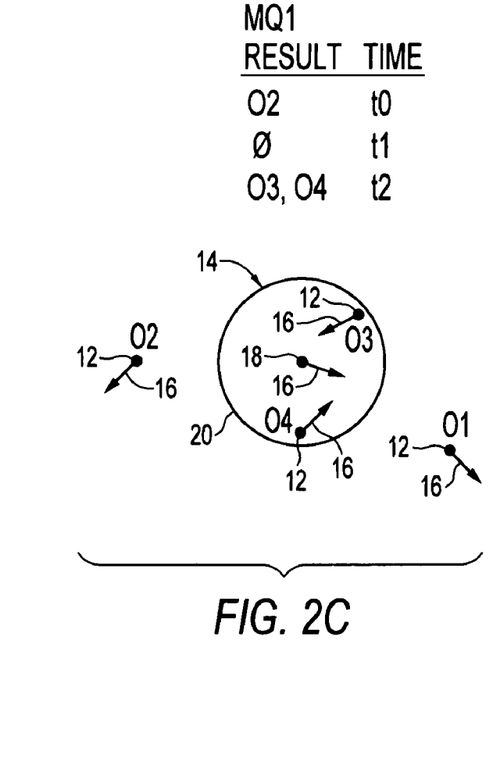
FIG. 2c is a schematic representation of the moving query at a third time.

As shown in FIGS. 2a, 2b, and 2c, the moving objects 12 and moving queries 14 move over time relative to each other, affecting both the locations of the moving objects 12, focal objects 18 and moving queries 14 and the results of the moving queries 14. FIG. 2a shows, at time t0, the moving query 14 and four moving objects 12, labeled O1-O4. The moving objects 12 and focal object 18 are represented as single points. The query result at time t0 is O2 because moving object O2 is inside the range of spatial range 20 of the moving query 14 at that time. FIG. 2b shows that at time t1 moving object O2 has moved outside the spatial range 20 of the moving query 14 and that no moving object 12 is currently within the spatial range 20. Hence, the query result at time t1 is the empty or null set. FIG. 2c shows that at time t2 moving objects O3 and O4 have moved inside the spatial range 20 of the moving query 14. As a result, the query results now contain moving objects O3 and O4.

The system 10 also includes one or more monitoring systems 22. Each monitoring system 22 is arranged to monitor and evaluate at least one of the plurality of moving queries 14 and moving objects 12 disposed within a monitoring region 24. The monitoring systems 22 can be arranged to passively receive signals that are broadcast from one of the moving objects 12 or moving focal objects 18 or to actively scan or obtain information from the moving objects 12 and focal objects 18. In one embodiment, the moving object 12 and moving focal objects 18 include systems to report their location, for example location awareness signals systems such as a global positioning system (GPS). Alternatively, each moving object 12 and moving focal object 18 includes an excitation coil to be utilized in a radio frequency identification system (RFID).

There is a separate monitoring region 24 for each monitoring system 22, and these monitoring regions 24 can be completely separate or can overlap. The monitor systems include signal receivers 26. Suitable receivers 26 include wireless receivers such as satellite communication dishes 28 and radio communication towers 30 or other antennas or WIFI systems. The receivers 26 monitor signals broadcast from the moving objects 12 and the focal objects 18 around which the moving queries 14 are based.

The moving objects 12 and focal objects 18 broadcast signals containing information, for example information about their position and motion. Alternatively, the moving objects could simply provide a unique identification signal, and the location and movement of the objects would be determined using methods such as triangulation. Preferably, the moving objects 12 and focal objects 18 broadcast information regarding their motion when there is a change in the function describing that motion.

Each monitoring system 22 includes a central processing unit (CPU) 32 or other logic control unit. Suitable logic control units 32 include programmable logic controllers, computer servers, mainframe type computers, desktop computers, portable or laptop computers and personal digital assistants. The logic control units 32 are capable of receiving, reading, interpreting and recording the information broadcast by the moving objects 12 and moving focal objects 18 and of analyzing and indexing solutions to the moving queries 14. The logic control units 32 are in communication with the receivers 26. Although the logic control units 32 can operate independently as stand-alone processors, preferably the logic control units are in communication with one another across a communication network 34. Suitable communication networks 34 include local area networks (LAN), personal area networks, wide area networks (WAN), for example the Internet or World Wide Web, wired or wireless telephone networks and combinations thereof. Each logic control unit 32 is in communication with one or more storage systems 37 to store the information received from the moving objects 12, moving focal objects 18 and moving queries 14, the evaluation results associated with the moving queries 14, motion equations, indexes of object information and query results and other necessary information.

An evaluation of a moving query involves finding a set of moving objects that currently meet the moving queries criteria. This solution set is the information that the person or system that created the moving query wants. For example, a dispatcher could want to locate all taxicabs within six blocks of a cellular phone carried by a person that is walking. In another example, the U.S. Coast Guard could wish to track the locations of patrolling rescue vessels in relationship to moving cargo ships to provide for the quickest response time should an incident occur. In this example, the moving queries could be associated with either the patrol vessels or the cargo ships. As the number of moving queries and moving objects grow, the amount of computational resources involved in periodically evaluating each query grows. Queries that have solution sets that change rapidly increase the demand on resources even more. This increased demand increases costs and the amount of time necessary to conduct the periodic query evaluations.

Figure 3:
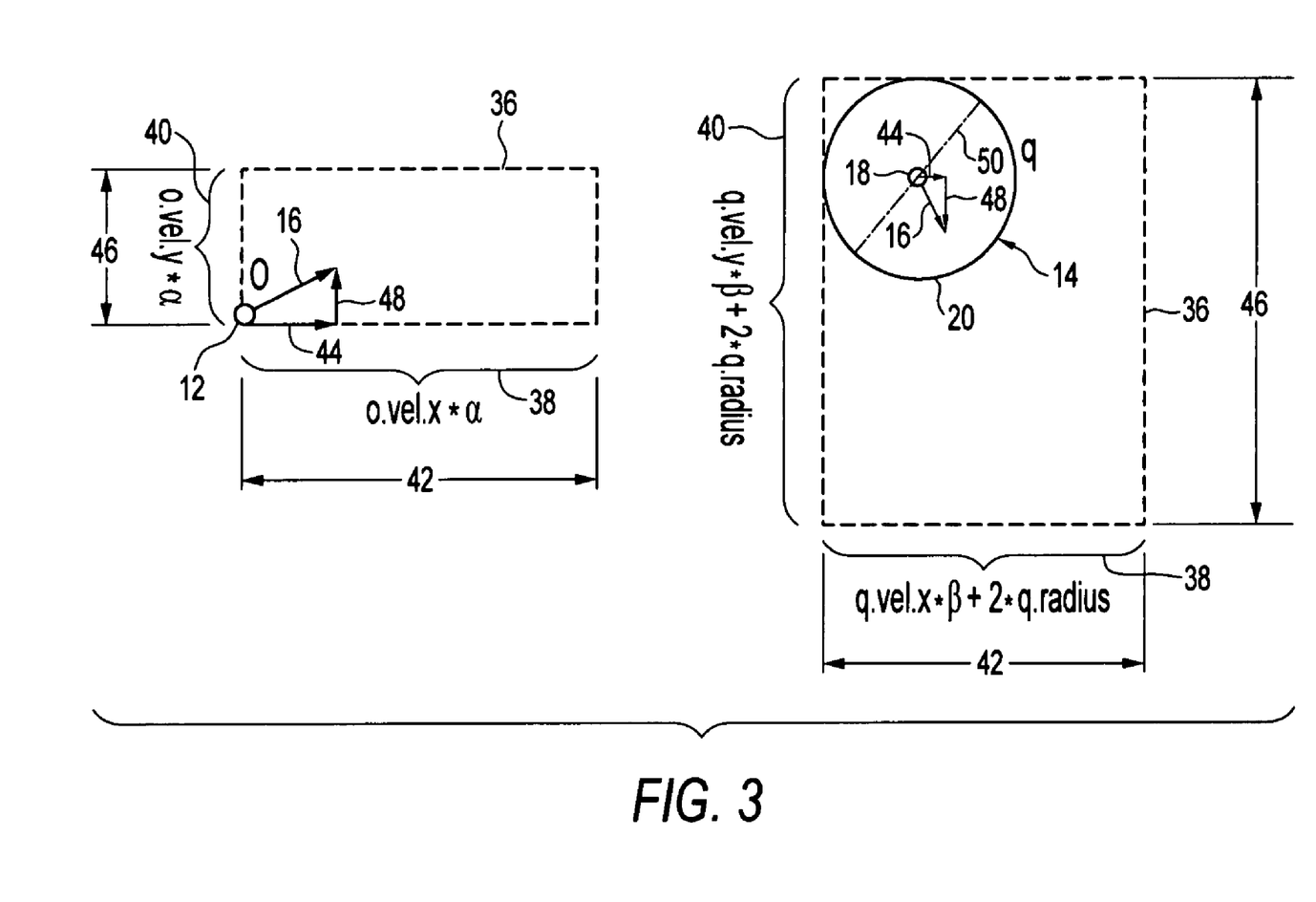
FIG. 3 is a representation of an embodiment of bounding boxes for the moving objects and moving queries in accordance with the present invention.

The system of the present invention, can reduce the demands on computational resources by minimizing the number of moving objects that have to be considered in periodic query evaluations. In one embodiment, the use of a motion-adaptive query index and a motion-adaptive object index by the monitoring systems 22 provides for efficient evaluations and reduced costs. Although each monitoring system 22 can utilize either the motion-adaptive query index or the motion-adaptive object index, preferably each monitoring system 22 maintains both of these indexes, increasing the overall performance and efficiency of the evaluation process. Instead of indexing directly on the positions of moving objects 12, focal objects 18 and moving queries 14, the motion-adaptive indexes use motion-sensitive bounding boxes 36 as shown in FIG. 3. A separate motion-sensitive bounding box 36 is constructed for each moving object 12 and each moving query 14. The motion-sensitive bounding boxes 36 are then used in place of the spatial ranges 20 of the moving queries 14 in the query index and in place of the actual location of the moving objects 12 in the moving object index.

A spatial index method is used as the underlying index structure for the query and object indexes. Any suitable spatial indexing system can be used. For example R-tree or R+-tree indexing can be used. R-tree indexing uses approximation of spatial objects with bounding objects, for example rectangles. R-trees may use approximation of spatial objects with bounding rectangles with the sides of the rectangle parallel to the axes of the data space. In one embodiment, the spatial indexing system is R*-tree. R*-tree indexing uses overlap enlargement criterion on the level preceding to the leaf level, reducing the number of disk accesses.

The size and shape of each bounding box 36 can be varied based upon the speed and direction of the moving object 12 or moving query 14 with which it is associated. In one embodiment, the size of a bounding box 36 can be adaptive to both the speed and the frequency of changes in direction of the object 12 or query 14 to which it is associated. If the bounding box 36 is too large, then the cost of search operations will be too high, because larger bounding boxes 36 produce increased overlapping among bounding boxes 36. Increased bounding box 36 overlapping results in decreased indexing performance due to the increased amount of data necessitated by the increased overlapping. Conversely, if the bounding boxes 36 are too small, the moving objects 12 will quickly move out of the boxes 36. Once the moving objects 12 are out of the bounding boxes 36, the index is updated to reflect the new bounding boxes 36, increasing the update cost of the index.

In general, the bounding box 36 occupies a larger spatial area than the object 12 or query 14 contained within it. Hence, the moving object 12 or moving query 14 can move within the bounding box 36. The length of time that a moving object 12 or moving query 14 spends within a given bounding box 36 depends on the speed and direction of the moving object 12 or moving query 14, the size and shape of the bounding box 36 and the initial position of the moving object 12 or query 14 within the bounding box 36.

The initial position of the moving object 12 or query 14 is selected to maximize the duration of the object 12 or query 14 within the bounding box 36 given current speed and direction. For a rectangular bounding box 36, the moving object 12 or moving query 14 would be initially disposed at one of the corners with its motion vector 16 aligned generally along a diagonal of the rectangle. Therefore, although a given object 12 or query 14 may have changed its position from one evaluation period to the next, the object 12 or the query's spatial region 20 is still contained within the same bounding box 36. Therefore, the position of the bounding box 36 does not have to change and the associated indexes do not have to be updated. Because the bounding boxes 36 change less often than the positions of the moving objects 12 and queries 14, the costs associated with updating and searching the query index and the object index are significantly reduced. In addition, the time needed for each query evaluation is reduced, facilitating more frequent evaluations of query results.

An embodiment of motion-sensitive bounding boxes for a moving object and a moving query is illustrated in FIG. 3. Given a moving query 14 or a moving object 12 and its associated velocity vector 16, which can be received or calculated, a motion-sensitive bounding box 36 for the query 14 or object 12 is calculated and constructed by extending the minimum bounding box of the query 14 or object 12 along the x-dimension 38 and the y-dimension 40, or the x-, y- and z-dimensions for a three-dimensional bounding box, by a factor equal to a multiple of the component of the velocity 16 of the query 14 or object 12 in each component dimension. The minimum bounding box is the smallest shape that will completely enclose the moving object 12 or the spatial region 20 of the moving query 14.

For example, the a first bounding box 36 for a moving object 12 is calculated as a rectangle with width 42 equal to the component of its velocity in the x-direction 44 multiplied by a factor $\alpha$ (o.vel.x*$\alpha$) and a height 46 equal to the component its velocity in the y-direction 48 multiplied by a factor $\alpha$ (o.vel.y*$\alpha$). The bounding box 36 for a moving query 14 having a circular spatial range 20 is calculated as a rectangle with a width 42 equal to the sum of the diameter 50 of the circular spatial range 20 and the product of the x-component of its velocity 44 multiplied by a factor $\beta$ ((q.vel.x)+d) and a length 46 equal to the sum of the diameter 50 of the circular spatial range 20 and the product of the y-component of its velocity 48 multiplied by a factor $\beta$ ((q.vel.y)+d). The use of rectangular bounding boxes 36 provides a more efficient indexing method during data updates. Other approaches can also be used to construct suitable motion-sensitive bounding boxes 36.

The values for $\alpha$ and $\beta$ may be selected depending on the speed of a moving object 12 or moving focal object 18 and how often the object changes its moving direction. For example, at relatively high speeds $\alpha$ and $\beta$ are relatively small to prevent excessively large bounding boxes 36. The values for $\alpha$ and $\beta$ can be calculated based on an analytical model or on simulations. A table of suitable values for $\alpha$ and $\beta$ can be computed in advance for various speeds and mean times between changes in direction. Any suitable analytical method or simulation known and available to one of skill in the art can be used to determine $\alpha$ and $\beta$. As a result, the configuration of the motion-sensitive bounding box 36 varies with or adapts to the moving object's behavior, and the indexing approach is called motion-adaptive indexing. With bounding boxes 36 in the index, computations are needed to check whether or not the moving objects 12 are inside the moving queries 14. Motion functions are needed in such computations.

In another embodiment, predictive query results are used to increase the speed and efficiency of each query evaluation. Although predictive query results can be used separately, preferably these results are used in conjunction with motion-adaptive query and object indexes. Predictive query results also use bounding boxes 36 associated with each moving object 12 and moving query 14. Suitable types of bounding boxes 36 are the same as for the motion-adaptive query and object indexes. In order to generate predictive query results, the motion of each individual moving object 12, including the focal objects 18 of each individual moving query 14, is modeled as a motion function of its location at a particular instant in time, a velocity vector and time. This modeling creates a motion function that, in combination with the bounding box 36, is used to determine the location of moving objects 12 and moving queries 14 in the future and to compute or predict future query results. Since the motion functions of the moving objects can change over time, the predictive results are valid only for a defined period of time.

Figure 4:
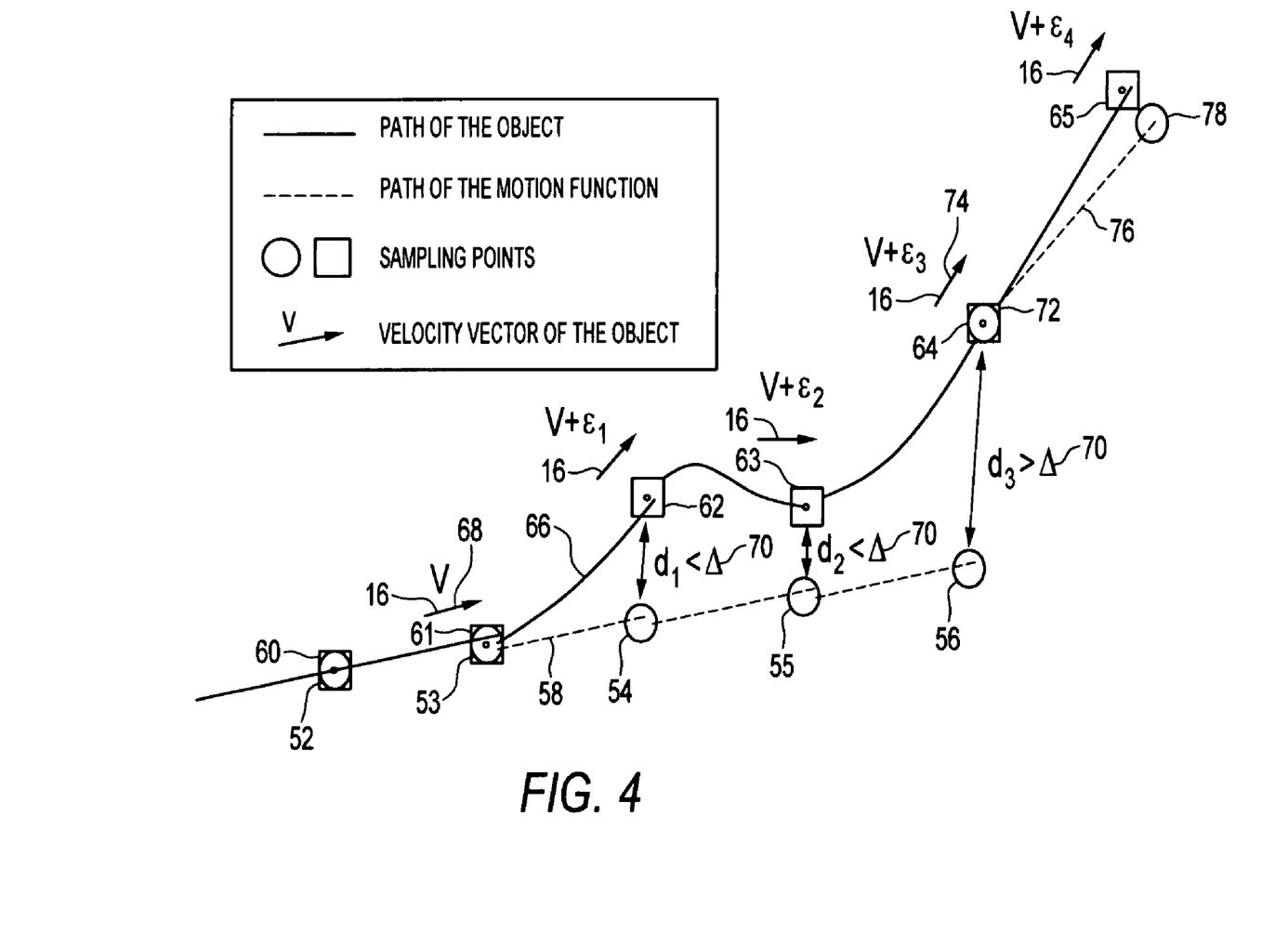
FIG. 4 is a schematic representation of an actual vs. predicted path of a moving object.

An example of the actual path traversed by a moving object 12 and the path predicted by the motion function is illustrated in FIG. 4. A plurality of discrete predicted positions 52-56 are illustrated along an initial predicted path 58. In addition, a corresponding plurality of discrete actual positions 60-65 are shown along the actual path 66. A motion or velocity vector 16, represented by an arrow, is associated with each position 60-65 on the actual path 66. The motion vector 16 represents the actual velocity of the moving object 12 at that position. Initially, the first predictive position 52 is set to coincide with the first actual position 60 of the moving object 12. The initial velocity vector 68 for the predicted path 58 is equivalent to the actual velocity vector 68 associated with the moving object 12 at the first actual position 60.

Because the velocity vector 16 of the moving object 12 may change over time due to changes in speed or direction, the actual path 66 and predicted path 58 can diverge. Divergence between these paths is acceptable and tolerated when the distance between the actual and the predicted position is within a pre-determined threshold ($\Delta$) 70. For a given evaluation, if the distance between the actual position and the predicted position is less than or equal to the threshold, the velocity vector used for the predicted path is maintained. When this distance is greater than the threshold, the moving object 12 reports an updated actual position and a current velocity vector to the monitoring system 22. The motion function for the moving object 12 is updated accordingly and used for subsequent predicted path locations. Preferably, a moving object 12 does not report its position, velocity function and time until its predicted position varies from its actual position by more than the threshold value $\Delta$. The threshold value $\Delta$ represents an application specific tolerance. Typically, this figure is as small as possible. In one embodiment, the threshold value $\Delta$ is set to a tolerance of less than about 2%.

The temporal interval used to calculate the query results is set to a time interval in which the moving object 12 is expected to be valid. As long as moving objects do not change their velocity vectors, this information will remain valid. When they do, additional processing and updates to the query results are needed.

As illustrated, for example, predicted positions 53,54,55 have a distance from actual positions 61,62,63 of less than the pre-determined threshold $\Delta$ 70. The predicted positions 53,54,55 are within the threshold even though the velocity vectors 16 for the actual positions 62,63 differ from the initial velocity vector 68 used to calculate the predicted path 58. Therefore, the predictive motion function used to calculate the predictive path 58 is not changed. The fifth predicted position 56, however, has a distance from the fifth actual position 64 that exceeds the pre-determined threshold $\Delta$. Therefore, the fifth predicted position 56 is moved to an adjusted fifth predicted position 72 that corresponds to the fifth actual position 64. In addition, a new motion function is established using the velocity vector 74 associated with the fifth actual position 64. The updated motion information is used to calculate a new predicted path 76 and the sixth predicted position 78 of the moving object. Using predicted query results decreases the amount of information sent to and recorded by the monitoring systems 22, saving time, computational resources, and costs.

Figure 5:
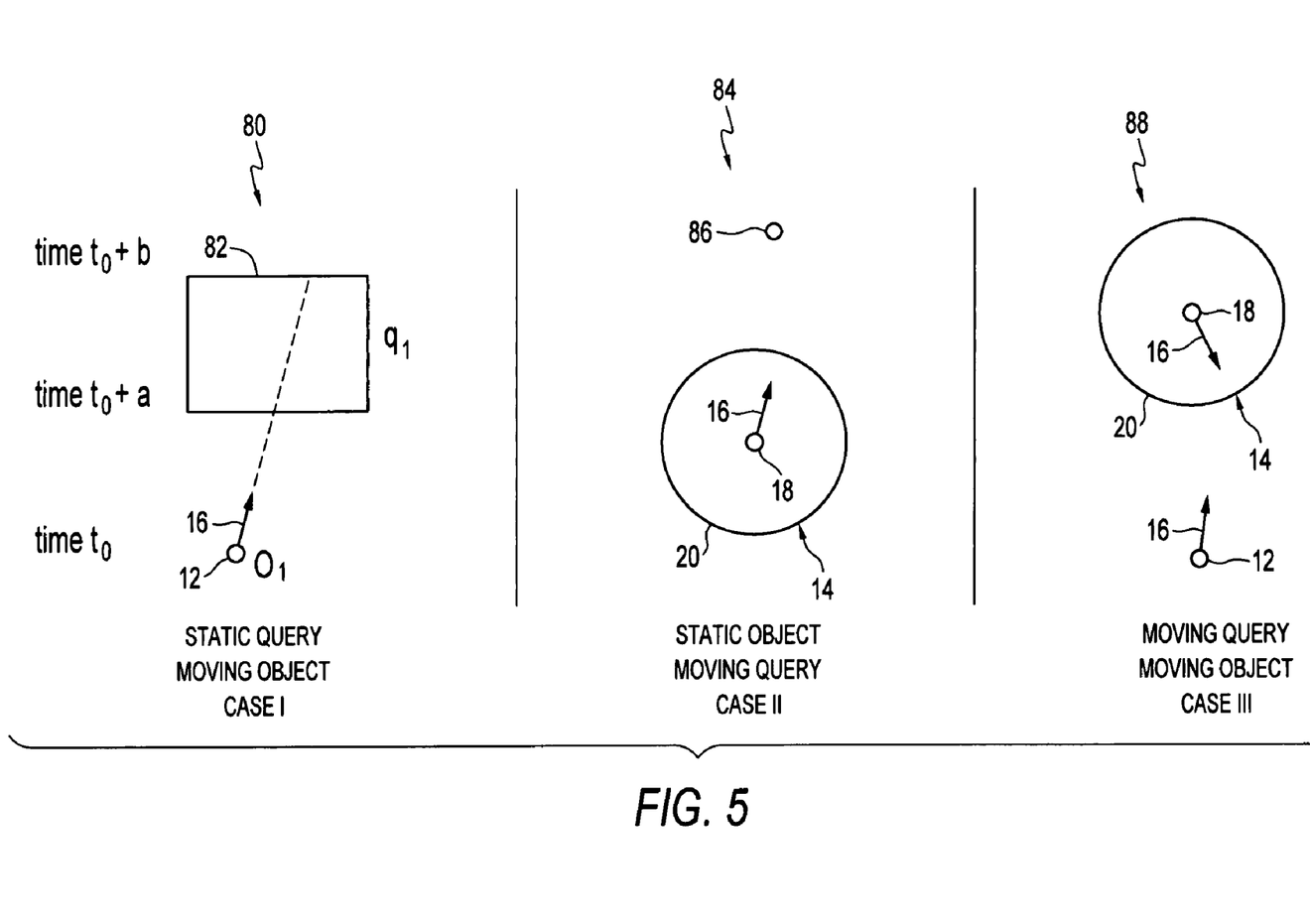
FIG. 5 is a schematic representation of three different arrangements of objects and queries.

FIG. 5 illustrates three different cases that arise when computing predicted query results. Case I 80 is the case of a static query 82 and a moving object 12. Using the motion function of moving object at time t0, the query result for the interval between time t0+a and time t0+b can be predicted. An example of a system having moving objects and static queries is illustrated in co-pending U.S. patent application Ser. No. 10/671,932, filed on Sept. 29, 2003, by Chen et al., and titled "Method and Structure for Monitoring Moving Objects". The entire disclosure of that application is incorporated herein by reference. Case II 84 involves a static object 86 and a moving query 14. The motion function of the moving query 14 can be used to predict the query result and the interval over which this result will remain valid. Case III 88 involves a moving object 12 and a moving query 14. The motion functions of both the moving object 12 and the moving query 14 are used to find out the time interval when the moving object 12 will be inside the spatial range 20 of the moving query 14.

In order to create the most accurate and comprehensive prediction for a given moving query 14, the moving objects 12 that are most likely to be in the query results are chosen for analysis. Objects 12 that are too far away from the moving query 14 are not selected, because the predicted query results are less likely to remain valid. In other words, the farther away a moving object 12 is from the moving query 14, the longer the period of time before the moving object 12 enters the spatial range 20 of the query 14. The longer the time period is before the moving object 12 enters the spatial range 20 of the query 14, the greater the likelihood that the moving functions associated with either the moving object 12 or the focal object 18 of the query 14 will have changed, invalidating the predicted query results.

In one embodiment, the bounding boxes 36 associated with the moving objects 12 and the moving queries 14 are used to decide which objects 12 should be considered in performing predictive query results. For a given moving query 14 and bounding box 36, those objects 12 having bounding boxes intersecting the query's bounding box 36 are considered as potential candidates for predictive query results.

Figure 6:
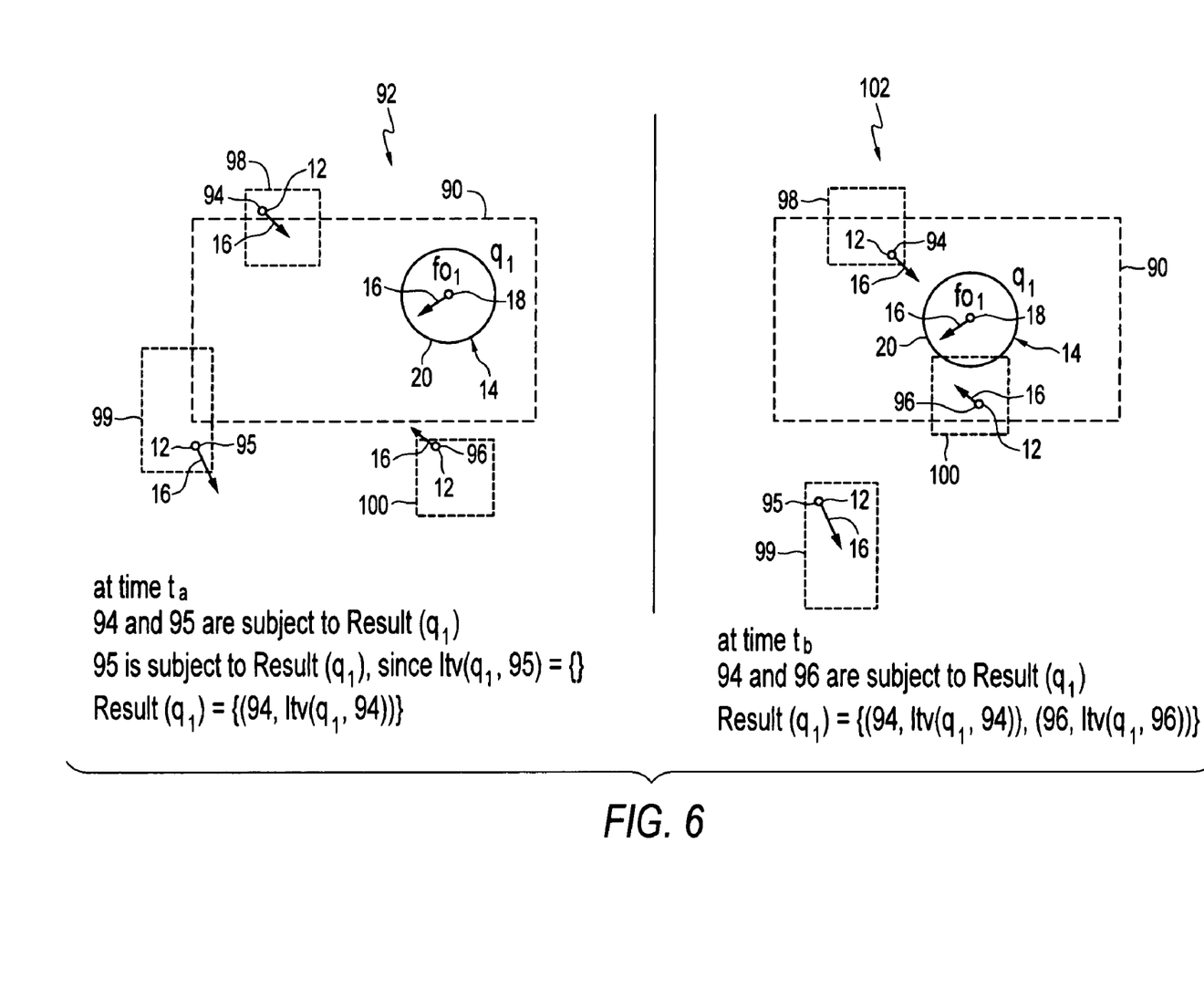
FIG. 6 is a schematic representation of intersecting bounding boxes for a moving query and moving objects at two separate time periods.

An example of a predictive query result for a given moving query 14 over a plurality of moving objects 12 is illustrated in FIG. 6. The moving query 14 is disposed within an associated moving query bounding box 90. In addition, first, second and third moving objects 94-96 are disposed within respective bounding boxes 98-100. At time $t_a$ 92, the moving query bounding box 90 intersects with the bounding boxes 98,99 of the first and second moving objects 94,95. Therefore, the first and third moving objects 94,95 are considered in the predictive query analysis, and the motion functions associated with these two moving objects 12 are used to calculate the time intervals when the objects 12 will be inside the spatial range 20 of the moving query 14. However, since the second moving object 95, as indicated by its motion vector 16, is moving away from the spatial range 20 of the moving query 14, the predictive query result contains only the first moving object 94 and its interval. At the next time interval $t_b$ 102, the bounding box 100 associated with the third moving object 96 also intersects with the moving query bounding box 90. As a result, the predictive query result also contains both the first and third objects 94,96 and the intervals associated with these moving objects.

In order to use the system 10 of the present invention to evaluate moving queries 14 over moving objects 12, each monitoring system 22 periodically determines the results, for example a set of moving objects 12, of all moving queries 14 within its respective monitoring regions 24. In one embodiment, the monitoring systems 22 use a motion-adaptive indexing process in accordance with the present invention to evaluate the moving queries 14. The results of these processes are maintained in a motion-adaptive object index and a motion-adaptive query index. In addition to maintaining a motion-adaptive object index and a motion-adaptive query index for each moving object 12 and moving query 14, each monitoring system 22 maintains a moving object table (MOT) and a moving query table (MQT) for the moving objects 12 and moving queries 14 within its monitoring range 24. The MOT maintains information regarding the moving objects 12, including the object ID, the query ID (if the object is the focal object of a moving query), the position, the velocity vector, the timestamp of the last change in motion function, the bounding box, the estimated time before the object changes its motion function and a flag indicating whether or not the motion function has been changed since the last evaluation. Similarly, the MQT maintains information regarding the moving queries 14, including the query ID, the position, the velocity vector, the timestamp of the last change in motion function, the radius of the spatial query range, the bounding box, the estimated time before the query will change its motion function, and the flag indicating whether or not the motion function has been changed since the last re-evaluation. All of this information can be supplied to the monitoring systems by the moving objects.

Although these tables could be maintained in a centralized database that is accessible by the each monitoring system, preferably these tables are maintained in the storage systems 37 disposed in each monitoring system 22. Periodic evaluations of moving queries 14 are performed by scanning these two tables and performing updates searches on the motion-adaptive indexes as needed in order to maintain up-to-date query results. Since changes in query results due to object movements only occur during an evaluation, the period of time between subsequent evaluations is made as short as possible to ensure that the query results are as up-to-date as possible. Making each evaluation itself as efficient as possible contributes to shorter cycle times between subsequent evaluations. In addition, there are costs associated with updating the indexes every time a new position is received.

The entries in the MOT and MQT are updated whenever new motion updates are received from the moving objects. However, these motion updates are not reflected in the query results until the next periodic query evaluation is performed. At every query evaluation, two scans are performed. The first scan covers the MOT, and the second scan covers the MQT. The MOT scan is used to update the motion-adaptive object index and to differentially update some of the query results by searching the motion-adaptive query index. The MQT scan is used to update the motion-adaptive query index and to re-calculate some of the query results by performing searches on the motion-adaptive object index. The two scans can be performed in any order. For example, the MQT scan can be performed first followed by the MOT scan.

Figure 7:
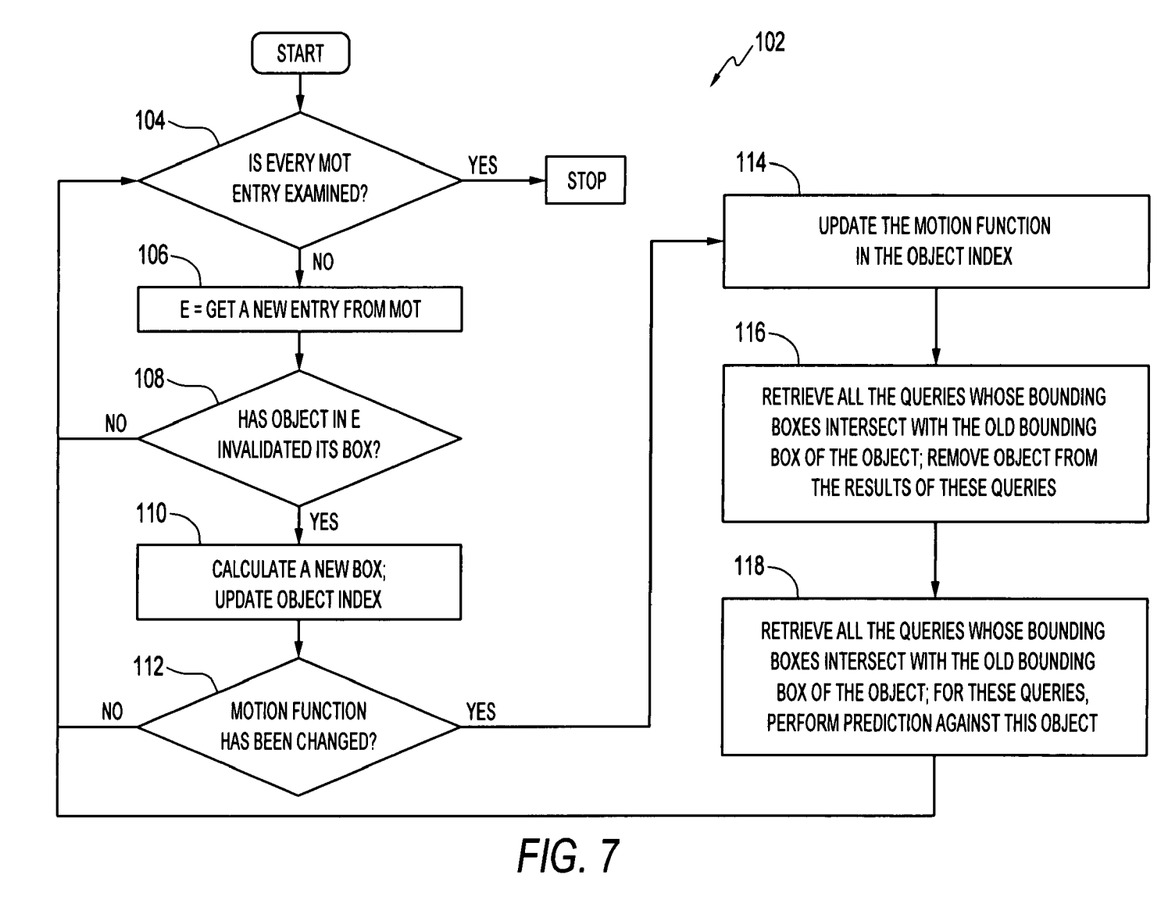
FIG. 7 is a flow chart illustrating an embodiment of a moving object table scan.

FIG. 7 illustrates an embodiment of a single MOT scan 102 for a given monitoring system 22. First the monitoring system 22 checks to see if every entry in the MOT has been examined 104. If every entry has been examined during the present scan, then the MOT scan stops. If entries remain to be scanned, the monitoring system 22 obtains a new entry from the MOT 106. The monitoring system then evaluates whether or not the selected entry has been invalidated, or exceeded the limits of its bounding box 108. If the bounding box is still valid, then the monitoring system 22 returns to see if every entry in the MOT has been examined 104. If the bounding box is no longer valid, the monitoring system 22 calculates a new bounding box and updates the motion-adaptive object index accordingly 110. The multiplying factor α used for calculating this new bounding box is selected adaptively based on the selected object's speed and the mean time before the selected object is expected to change its motion function. The monitoring system then checks if the motion function associated with the selected entry has changed 112. If the motion function has not changed, then the monitoring system returns to see if every entry in the MOT has been examined 104. If the motion function has changed, the data associated with the object's bounding box in the motion-adaptive object index including the motion function are updated 114. Once the bounding box data are updated, the monitoring system 22 performs two searches on the motion-adaptive query index. In the first search, the monitoring system 22 searches the motion-adaptive query index to locate all the queries 14 whose bounding boxes 36 intersect with the old bounding box of the selected object 116. The monitoring system 22 then removes the selected object 12 from the results of these moving queries 14. In the second search, the monitoring system 22 searches the motion-adaptive query index again to identify all the queries 14 whose bounding boxes 36 intersect with the new bounding box of the selected object 118. For these queries 14, the monitoring system 22 uses the selected object to perform result prediction and to calculate the intervals when the predicted query results will be valid. The monitoring system 22 then adds the selected object and the predicted interval to the proper query results and returns to see if every entry in the MOT has been examined 104.

Figure 8:
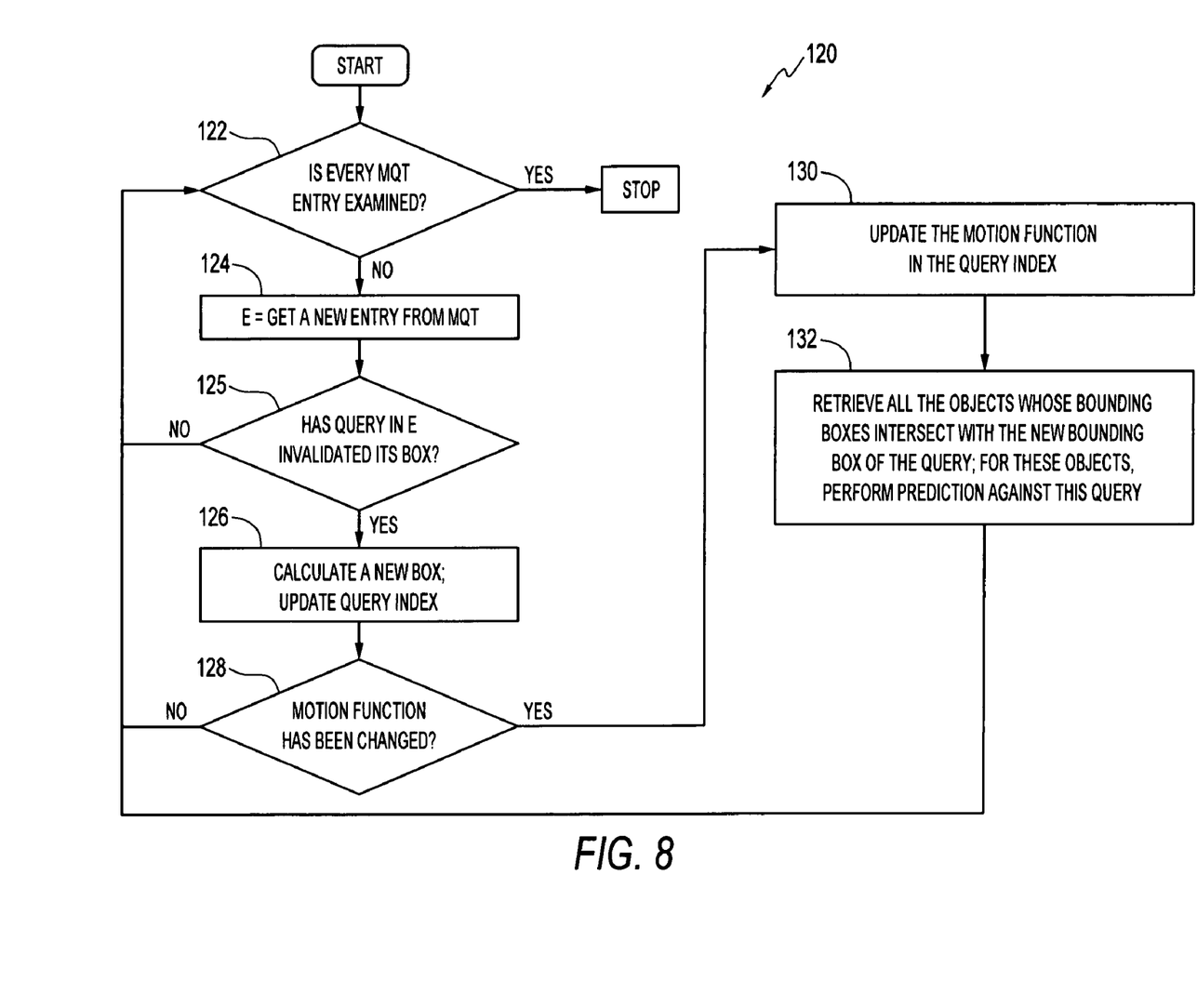
FIG. 8 is a flow chart illustrating an embodiment of a moving query table scan.

FIG. 8 illustrates an embodiment of a single MQT scan 120 for a given monitoring system 22. The single MQT scan is very similar to the MOT scan described with respect to FIG. 7. First, the monitoring system 22 checks to see if every entry in the MQT has been examined 122. If yes, then the monitoring system 22 stops the scan. If not, then the monitoring system 22 obtains a new entry from the MQT 124. The monitoring system 22 then determines whether or not the selected moving query 14 has invalidated its bounding box 125. If not, then the monitoring system 22 checks to see if every entry in the MQT has been examined 122. If the bounding box 36 has been invalidated, the monitoring system 22 calculates the new bounding box 36 and updates the motion-adaptive query index 126. Next, the monitoring system 22 determines if the motion function has changed 128. If not, then the monitoring system 22 checks to see if every entry in the MQT has been examined 122. If the motion function has changed, then the monitoring system 22 updates the motion functions associated with the selected query in the motion-adaptive index 130. Once the motion-adaptive query index is updated 130, the monitoring system 22 retrieves all of the moving objects 12 whose bounding boxes 36 intersect with the new bounding box of the selected query 132. Unlike the MOT scan, however, only one search operation against the motion-adaptive object index is performed after the query index is updated 132. For the retrieved objects, the monitoring system 22 performs result prediction against the query. The monitoring system then returns to see if every entry in the MQT has been examined 122.

Following the MOT scan, all the existing results are correct for the queries that have not invalidated their bounding boxes 36 or changed their motion functions. For queries that have invalidated their bounding boxes 36 or whose focal objects 18 have changed their motion functions, the query results are re-calculated during the MQT scan. As a result, all the query results are up to date after the MQT scan.

In another embodiment of the present invention, the system and method of the present invention for processing continually moving range queries 14 can be used to evaluate continually moving k-nearest neighbors (k-NN) queries. In order to support kNN queries, three modifications are made. Instead of storing time intervals in query results, the distance of the objects 12 from the focal object 18 of the query 14 as a function of time is stored. During the MQT scan, when a query 14 has invalidated its bounding box 36 or changed its motion function, the monitoring system 22 determines a safe radius that is guaranteed to contain at least k moving objects until the next time such safe radius is calculated. The kNN query is installed as a standard moving query with its range equal to the safe radius. At the end of each query evaluation, the results are sorted based on their distances to their associated focal objects 18 by using the distance functions stored within the query results. The top k results are then marked as the current results.

The safe radius ensures that there will be at least k objects contained in the radius during the next t time units. In one embodiment, the safe radius is calculated by retrieving the current k-nearest neighbors and calculating the maximum possible distance of the each one of the current k-nearest neighbors from the focal object 18 of the query 14 at the end of the t time units. The maximum distance can be calculated using the focal object's motion function and the upper limits on the maximum speeds of the current k-nearest neighbors.

In addition to being suitable for use in evaluating moving queries over moving objects, the method of the present invention is also suitable for use in other query and object systems. For example, the target objects can be stationary, and the queries can be moving. An example of such a moving query is: "Give me the locations of the wireless towers within 1 mile of my car during the next half an hour," posted by a driver of a moving car, where the focal object of the query is the car on the move. Alternatively, the queries can be associated with stationary focal objects, and the objects can be moving. An example of such a query is: "Give me the list of AAA vehicles that are currently on service call in the downtown area of Atlanta during the next hour."

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for evaluating a plurality of moving queries over moving objects, the queries and objects moving with respect to each other, the method comprising:

identifying a plurality of moving objects, each moving object comprising a position, a speed and a direction;

identifying a plurality of moving queries capable of evaluating the moving objects using criteria that change over time;

constructing a moving object bounding box associated with each moving object, each moving object bounding box comprising dimensions corresponding to at least one of the position, the speed and the direction of the associated moving object;

constructing a moving query bounding box associated with each moving query, each moving query bounding box comprising dimensions corresponding to one or more of the criteria, each bounding box sized to minimize overlapping among all bounding boxes and to maximize a length of time that the criteria of each moving query and the position, speed or direction of each moving object remain within the associated bounding box;

creating an object index for each one of the plurality of moving objects and a query index for each one of the moving queries using the corresponding bounding boxes; and evaluating the plurality of queries periodically using the query index to determine which moving objects to include in the moving query evaluation.

2. The method of claim 1, wherein each bounding box comprises a motion-sensitive bounding box wherein the size and shape of each bounding box varies based upon a behavior of the associated moving object or moving query.

3. The method of claim 1, wherein the step of constructing the bounding box comprises placing each moving object or each moving query within the associated bounding box in an initial position arranged to maximize the length of time that the criteria of each moving query and the position, speed or direction of each moving object remain within the associated bounding box.

4. The method of claim 3, wherein each bounding box comprises a rectangle and the initial position comprises a corner of the rectangle.

5. The method of claim 1, further comprising receiving at least one of location information and motion information for each one of the moving objects and each moving query, determining if moving objects or moving queries have invalidated the associated bounding box based upon the received information, and replacing invalidated bounding boxes with new bounding boxes.

6. The method of claim 1, wherein the step of evaluating the moving queries periodically comprises generating predictive query results.

7. The method of claim 6, wherein the step of generating predictive query results comprises creating a motion function for each moving query and each moving object based upon a present location and a velocity vector associated with each moving object and moving query, computing a predicted path for each moving object and moving query based upon the associated motion function, comparing the predicted paths to actual paths for the moving objects and queries and computing new motion functions only when the predicted paths vary from the actual paths by a pre-determined threshold value.

8. The method of claim 6, wherein the step of generating predictive query results comprises using the bounding boxes associated with the moving queries and the moving objects to determine which moving objects to consider when generating the predictive query results.

9. The method of claim 8, further comprising selecting moving objects for the predictive query that have associated moving object bounding boxes intersecting with one of the moving query bounding boxes.

10. The method of claim 1, wherein the step of periodically evaluating the moving queries comprises maintaining a moving object table containing information about the moving objects.

11. The method of claim 10, wherein the step of evaluating the moving queries further comprises scanning the moving object table and updating the object index and the query index.

12. The method of claim 1, wherein the step of periodically evaluating the moving queries comprises maintaining a moving query table containing information about the moving queries.

13. The method of claim 12, wherein the step of evaluating the moving queries further comprises scanning the moving query table and updating the object index and the query index.

* * * * *